Nov. 12, 1935.  E. PEARSON  2,020,326
SYSTEM FOR AUTOMATICALLY MATCHING FREQUENCIES
Original Filed Feb. 26, 1924
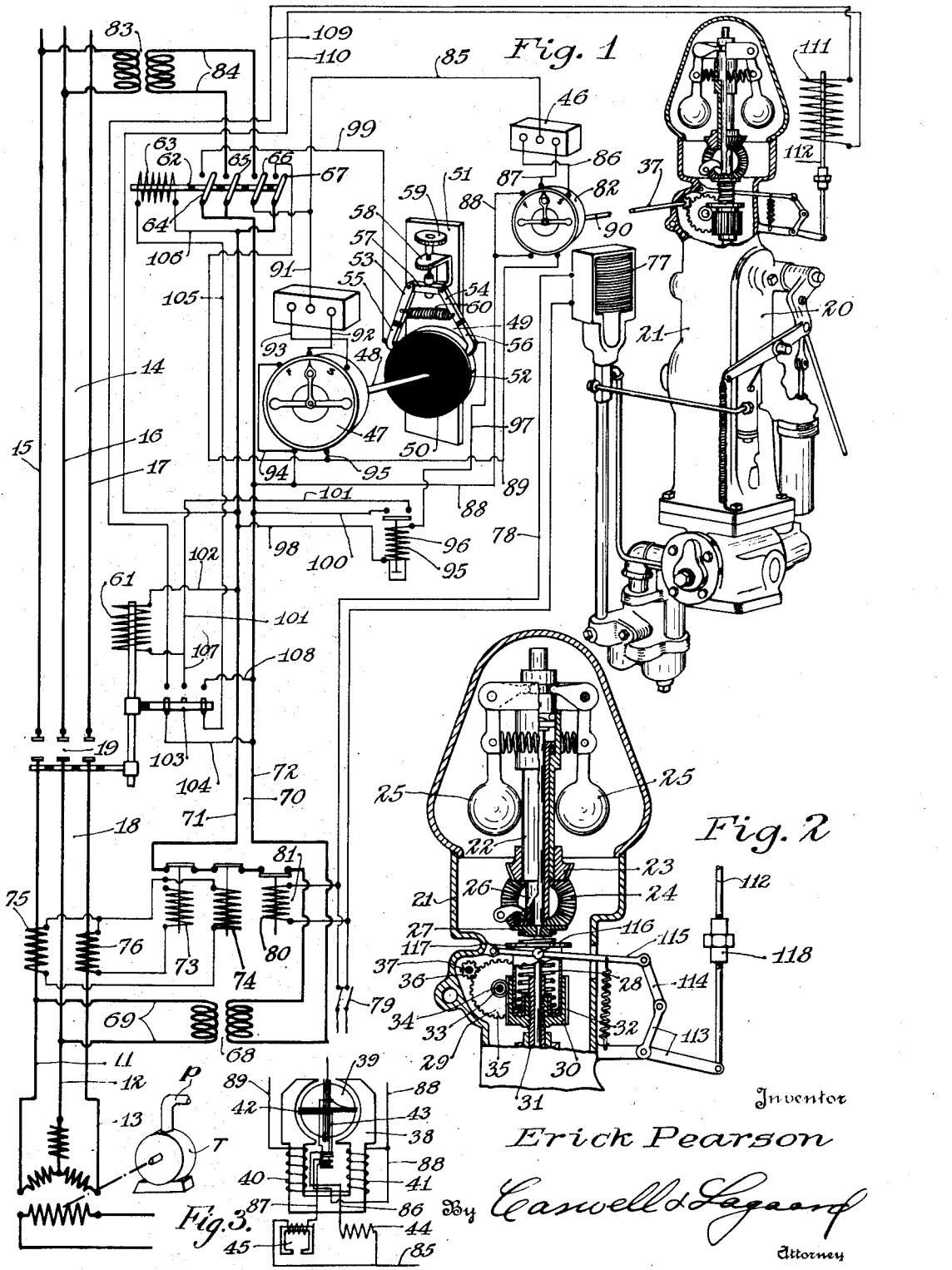
Inventor
Erick Pearson
By Caswell & Lagaard
Attorney Patented Nov. 12, 1935

2,020,326

UNITED STATES PATENT OFFICE 2,020,326

SYSTEM FOR AUTOMATICALLY MATCHING FREQUENCIES

Erick Pearson, Chicago, Ill.

Original application February 26, 1924, Serial No. 695,153. Patent No. 1,820,319, dated August 25, 1931. Divided and this application September 8, 1930, Serial No. 480,333. Renewed November 16, 1934

23 Claims. (Cl. 290—40)

My invention relates to systems for automatically matching the frequencies of a distribution system and a generator to be cut into the distribution system and has for an object to provide a system whereby the matching of the frequencies may be more accurately and positively accomplished.

Another object of the invention resides in providing in conjunction with a governor for governing the speed of the prime mover means for adjusting the speed controlling mechanism of said governor to bring the prime mover to synchronous speed.

A still further object of the invention resides in providing means for operating the adjusting means for said speed controlling mechanism, said operating means having a resultant effect varying with the difference in frequency of the generator and distribution system.

A feature of the invention resides in constructing the means for adjusting the speed controlling mechanism with a movable member and in providing motive means including windings deriving electrical energy from both the distribution system and generator for operating said movable member.

An object of the invention resides in constructing said motive means in the nature of a motor having rotor and stator windings connected to the distribution system and generator for operating said movable member.

Another object of the invention resides in constructing said motor in the form of a rotary synchronizing device.

Other objects of the invention reside in the novel combination and arrangement of parts and in the details of construction hereinafter illustrated and/or described.

This application is a divisional application of my application for patent Serial No. 695,153, filed February 26, 1924, now United States Patent 1,820,319, granted August 25, 1931 for Automatic synchronizers.

Certain features common to the disclosure of this application and application No. 558,024, filed August 19, 1931, are covered in the claims of that application.

In the drawing:

Fig. 1 is a wiring diagram illustrating an embodiment of my invention showing some of the parts in perspective.

Fig. 2 is a longitudinal sectional view of a portion of the governor and adjusting mechanism therefor.

Fig. 3 is a diagrammatic view of the synchronizing device used for operating the adjusting means for the speed controlling mechansm of the governor.

In the matching of frequencies in synchronizing alternating current generators with distribution systems, it has been customary to employ devices for operating the adjusting means for the speed controlling mechanism at a uniform rate of speed. Such devices frequently cause the generators to pass the desired speed requiring considerable manipulation before the generator may be finally connected to the system. The present invention provides a device whereby the adjustment of the speed setting adjusting device is more slowly performed as the frequency of the generator more closely approaches that of the system and which is more rapidly accomplished when the frequencies greatly vary so that the generator may be brought up to proper frequency in a minimum length of time.

For the purpose of illustrating the application of my invention I have shown the entire system disclosed in my copending application, now U. S. Patent 1,820,319. In this system, a three phase generator is illustrated at 10 which is connected to a three phase line including leads 11, 12 and 13. In conjunction therewith the main line or distribution line 19 is shown which is normally disconnected from the line 18 and which comprises busses or leads 15, 16 and 17. The line 18 from generator 10 may be connected to the line 14 through a line switch 19 arranged to be closed when the frequency and phase relation of the generator 10 correspond to that of the line 14. Inasmuch as the generator 10 may be of ordinary construction, the same has not been disclosed in detail in this application though it can readily be comprehended that the system will operate equally as efficiently on any type of generator whether the same is single phase or polyphase and whether the line be connected in star or delta.

The generator 10 is driven through a water wheel, turbine, or any other prime mover T, such as is now in general use, which has been shown conventionally in the drawing. In conjunction with the prime mover, a governor is employed which I have designated in its entirety at 20. This governor may be of standard design such as is well known in the art and the same will hence not be described in all its detail. In the particular embodiment of the invention illustrated, it has been assumed that the generator 10 is operated through a water wheel and in such case, the governor 20 is arranged with suitable valves for cutting off or increasing the supply of water to the water through pipe P wheel. The governor shown may be of the type ordinarily known as a hydraulic water wheel governor or any other similar structure may be provided. The governor 20 includes a case 21 in which is rotatably mounted a sleeve 22. The sleeve 22 may be driven through a bevel gear 23 mounted thereon and from a meshing bevel gear 24 actuated through some rotating part of the generator or water wheel or from a synchronous or similar motor operated from the generator. In conjunction with the sleeve 22, the usual spring retarded fly balls 25 are employed which operate to reciprocate within said sleeve a longitudinally slidable spindle 26. At the lower end of this spindle is mounted a collar 27 against which said spindle abuts, and against which one end of a compression coil spring 28 is seated. The other end of the coil spring 28 is received within a cylinder 29 supported in a cup 30. The cup 30 is internally threaded to screw upon a second sliding spindle 31 which extends down into the governor and which operates certain valve mechanism controlling the flow of water to the water wheel. The structure operated by the spindle 31 being well known in the art, as previously brought out, is not disclosed in detail in this application.

In the operation of the device, opening of the valve operating the water wheel is controlled through the longitudinal position of the spindle 31. The position of this spindle in turn depends upon the pressure applied to the same through the cylinder 29 and cup 30 by the spring 28. With my invention I adjust the tension of the spring 28 to cause the governor to vary the speed of the prime mover until the frequency of the generator is equal to that of the distribution system. This I accomplish as follows.

As will best be noted in Fig. 2, the cylinder 29 is rotatable within the cup 30. Upon the exterior of the cup 30 is formed gear teeth 32 in the nature of an elongated worm wheel which are adapted to mesh with a worm 33 fast on a shaft 34. The shaft 34 is journaled in the case 21 and has mounted on it a spur gear 35 which meshes with a spur pinion 36 fast on a counter shaft 37. The counter shaft 37 is journaled in case 21 and extends outwardly therefrom (Fig. 1) where the same may be rotated through the motive means constituting a part of my invention. It will be readily comprehended that as shaft 37 is rotated in one direction, gear 35 is driven and the cup 30 turned about the threads thereof through the worm 33 and the worm teeth 32 to increase or decrease the tension of the spring 28 as the case may be. When tension of the spring 28 is increased, the sleeve 31 travels downwardly a greater distance to cause a larger opening of the valve operating the turbine so that the speed of the turbine increases to bring the same up to synchronism with the distribution system. If the speed of the turbine is too great, the shaft 37 is rotated in the opposite direction and the pressure applied through spring 28 lessened causing the opposite effect on the turbine valve and reducing the speed of the turbine. It will hence be readily comprehended that the proper speed desired may be automatically attained, while the turbine and generator are in operation, through the rotation of the shaft 37 while such speed selected is maintained through the fly balls 25 in the customary manner.

For operating the shaft 37, a number of different devices may be employed, though I have found that an ordinary synchroscope which I have indicated at 82 serves the purpose very well. Such a synchroscope is shown in detail in Fig. 3. This device comprises a field core 38 within which is rotatably mounted a rotor 39. The field core 38 has wound upon it windings 40 and 41 while the rotor 39 has wound upon it windings 42 and 43, such windings being preferably disposed in angular relation to one another. The windings 42 and 43 have respectively connected in series with them a resistance 44 and a reactance 45, (Fig. 3) both shown as mounted in a single case 46 in Fig. 1. The resistance 44 and reactance 45 serve to produce a certain phase relation of the coils 42 and 43 with respect to the field core 38 so that when the applied currents are in phase relation, the rotor 39 occupies a definite position with respect to the field core 38. In the use of this device in the present invention, it can readily be comprehended, however, that such construction is unnecessary and that the device may operate without either the reactance 45 or the resistance 44 by merely connecting the rotor windings with either the generator or distribution system and the stator windings to the other as will become more readily apparent from the following description.

In conjunction with the device for adjusting the speed setting mechanism of the governor, I employ an ordinary synchroscope which I have indicated in its entirety at 47. This device may be constructed in the usual manner and may be of the type illustrated in Fig. 3. This synchroscope is provided with a shaft 48 which is connected with a controlling device indicated in its entirety at 49.

The controlling device 49 comprises a rotating member 50 rotatably mounted upon a base 51 and driven from the shaft 48. This member is constructed with a segmental contact strip 52 which is adapted to be engaged with the free ends 55 and 56 of two contact arms 53 and 54. The ends 55 and 56 are insulated from the arms 53 and 54 as diagrammatically illustrated in the drawing. The contact arms 53 and 54 are pivoted to a bar 57 which is adjustably mounted in a bracket 58 attached to the base 51. The bar 57 may be moved along said bracket through an adjusting screw 59 whereby the arc of the segment 52 spanned by the contact bars 55 and 56 may be varied at will. The arms 53 and 54 are normally held together through a tension coil spring 60. As the member 50 rotates a current is established through the contacts 55 and 56 the duration of which depends upon the setting of the said arms and the rapidity of rotation of the shaft 48 of the synchroscope 47.

The main line switch 19 is adapted to be closed through a solenoid 61 which is operated as will be subsequently more fully described. In conjunction with the switch 19 a magnetically operated circuit closer 62 is employed which is adapted to be closed through a solenoid 63. This circuit closer includes four switches 64, 65, 66 and 67 which are adapted to be simultaneously closed upon operation of said circuit closer through the solenoid 63.

For the purpose of providing electric current for operating the switch 62, and likewise the switch 19, a transformer 68 is employed which has its primary connected through leads 69 with the busses 11 and 12 of the generator line 18. The secondary of this transformer is connected to a feed line 70 including leads 71 and 72, of which the lead 71 is connected to the switch 67 and the lead 72 is connected to both of the switches 64 and 65. In the circuit 70 are disposed ordinary overload time limit relays 73 and 74 which are connected through suitable current transformers 75 and 76 to the line 18. These relays normally retain the circuit 70 closed but an overload opens said circuit in the usual manner. The action of these devices being well understood and not constituting any particular part of the invention they have but been described briefly.

In order to start the system in operation, I employ a solenoid 77 which is adapted to open a valve which subjects the mechanism of the governor to the fluid under pressure utilized for operating the same. Upon operation of the governor, the valve or gate controlling the flow of water through the water wheel is opened, setting the prime mover into operation. This construction, being well known in the art and forming no particular part of this invention, has not been described in detail. For operating the solenoid 77, I employ a circuit 78 which is provided with a starting switch 79 and which may be energized from any suitable source of electric current. The switch 79 may be disposed remotely from the plant to permit of operating the system by remote control or the same may be conveniently located in the power plant. The switch 79 is maintained closed as long as the generator to be cut in is desired to operate. Upon opening the switch 79, the entire mechanism is cut out and the supply of water to the turbine shut off. In the circuit 70 is disposed a normally open relay 80 whose solenoid 81 is adapted to be energized from the circuit 78 when the switch 79 is closed. This relay closes the circuit 70 and brings the current up to the circuit closer 62.

The synchroscope 82 is energized as follows. The primary of a transformer 83 is connected to one phase of the distribution line 14. The secondary of this transformer is connected through conductors 84 to the two switches 65 and 66 so that, when the circuit closer 62 is closed, one conductor of each of the transformers 83 and 68 are connected together. The reactance 45 and the resistance 44 are connected to the switch 66 of the circuit closer 62 through a lead 85. When this circuit closer is closed, energy is had from the transformer 83 through circuit 84 for the resistance and reactance of the synchroscope 82. The resistance 44 and the reactance 45 are connected through leads 86 and 87 with the windings 42 and 43 of the rotor 39. The other terminal of the rotor 39 is connected through a conductor 88 with one terminal of the stator windings 41 which is further connected to the lead 72 of line 70. The two stator windings are connected in series. In a similar manner, a conductor 89 is connected to the remaining terminal of the stator windings 40 and to the switch 67. Upon closing the circuit closer 62, current flows from the transformer 83 through the two switches 65 and 66 and to the rotor of the synchroscope 82 in the usual manner. At the same time, current flows from transformer 68 through the switch 67, the lead 71 of circuit 70, and to the stator windings of the synchroscope. This causes the synchroscope to operate in the customary manner. Where the generator is out of phase or out of synchronism with the distribution line, the shaft of the synchroscope which is designated at 90 and which is connected to the shaft 37 commences to rotate in one direction or the other turning the gears 36, 35, 33 and 32 and varying the force exerted upon the spring 28. This in turn controls the operation of the governor to speed up or slow down the prime mover so that the frequency and phase relation of the generator may correspond with that of the distribution system.

The synchroscope 47 may be identical with that designated at 82 for operating shaft 37. This synchroscope is connected in identically the same manner as the synchroscope 82 and to the same conductors which serve to energize synchroscope 82. The reactance and resistance of this synchroscope are connected through a common conductor 91 with the conductor 85 of synchroscope 82 while conductors 92 and 93 connect said resistance and reactance with two of the terminals of the rotor windings of said synchroscope. The other terminal of the rotor windings is connected through a conductor 94 with one of the terminals of the stator windings which in turn is connected to the conductor 88 of synchroscope 82. The other terminal of the stator windings is connected through a conductor 95 with the conductor 89 so that both synchroscopes are operated in parallel from the same source of electric current.

In the operation of the device, the shaft 48 similar to the shaft 90 turns in one direction or the other depending upon the phase relation and difference in frequency of the generator and distribution system. The speed at which the shaft 48 rotates depends upon the differences in frequencies of the generator and distribution system and consequently the duration of the contact through the contact members 55 and 56 depends upon differences in frequencies of the generator and distribution system. It can readily be comprehended that the closer the generator comes to synchronism with the distribution system, the greater the duration of this contact. This duration of time is utilized to cut in the main switch as will be now described in detail.

In conjunction with the controlling device 49, a timed relay 95 is employed, the solenoid 96 of which is connected through a lead 97 with the contact 56 of said controlling device and through another lead 98 with the lead 71 of circuit 70. The other contact 55 of the controlling device 47 is connected with the switch 64 through a lead 99 so that upon closing of the contact closer 62 a circuit through the controlling device 49 is completed every time the rotating member 50 brings the segment 52 within the span of the contact arms 53 and 54. This contact, as previously stated, lasts for a length of time depending upon the speed of the synchroscope 47. The relay 95 is timed through a dash pot or other suitable timing device so that the plunger thereof is not fully retracted until after the lapse of a predetermined length of time. The relay 95 serves to close a circuit 100, 101, 102 which energizes the solenoid 61 for closing the main line switch 19. When the synchroscope 47 slows down sufficiently due to the generator approaching synchronism, the length of time which the circuit 99, 97, 98 remains closed is increased sufficiently so that the contactor of relay 95 may operate to close the circuit 100, 101, 102. When this occurs, the frequency and phase relation of the generator is sufficiently close so that the line switch may be cut in. When solenoid 61 is energized through the relay 95, the line switch is cut in and the generator then delivers electrical energy to the distribution line 14.

In conjunction with the line switch 19, a contactor 103 is employed which normally closes a circuit comprising leads 104, 105 and 106 which includes the solenoid 63 of circuit closer 62. When the generator is at rest, the circuit 70 is not energized and the solenoid 63 leaves the circuit closer 62 in open position. As soon as the generator picks up voltage, the transformer 68 is energized and the circuit 104, 105, 106 which is normally closed becomes energized and the circuit closer 62 set into operation. When this circuit closer closes the synchronizing device, the speed matching mechanism is energized which operates as previously described. When the line switch 19 is closed, the contactor 103 breaks the circuit 104, 105, 106 which immediately opens the contact closer 62 de-energizing the synchronizing device and speed matching apparatus. At the same time that the main line switch 19 is closed, the contactor 103 completes a circuit through a lead 107 connected to the solenoid 61 and through a lead 108 connected to the lead 72 of the line 70. This circuit serves as a maintaining circuit for energizing the solenoid 61 and maintaining the main switch 19 closed during the operation of the generator.

To cause the generator to take on load, a circuit comprising leads 109, 110 is employed which has connected in it a solenoid 111 shown in Fig. 1. The lead 110 is connected to the lead 71 of line 70, while the lead 109 is connected through the contactor 103 and lead 104 to the other side 72 of line 70. The plunger 112 of solenoid 111 is connected to a bell crank 113 (Fig. 2) which operates a toggle link 114. The toggle link 114 is connected to a swinging arm 115 having a cam 116 engaging a flange 117 on the cylinder 29 previously referred to. This increases the tension on the spring 28 causing the gate to open and the generator to take on load.

In the operation of the device, the switch 79 is closed, which actuates solenoid 77 and subjects the governor to the fluid under pressure which operates the gate controlling the flow of water to the water wheel and sets the prime mover T into motion. The prime mover drives the generator and as the generator picks up speed, it energizes the generator line 19 and transformer 68 connected thereto. At the same time that the switch 79 energizes solenoid 77, it likewise energizes solenoid 81 which closes the switch in the lead 71 of circuit 70 energizing said circuit as soon as the generator voltage picks up. As soon as the generator voltage is sufficiently high, the solenoid 63 of circuit closer 62, which is normally connected in a closed circuit parallelling circuit 70, is actuated which closes the switches 64, 65, 66, and 67. Upon closing circuit closer 62, electric energy is provided for operating both the synchroscopes 47 and 82 which commence to function in the ordinary manner. Supposing the generator frequency should vary from the distribution line frequency by an amount too great to permit of throwing in the main line switch, the synchroscope 47 will rotate the shaft 48 so fast that the length of time the contacts 55 and 56 are in contact with the segment 52 will be insufficient to close the circuit operated by the retarded relay 95. The closing of the circuit closer could not occur as long as this condition existed. During the operation of the synchroscope 47, the synchroscope 82 is rotating at a corresponding rate of speed and the shaft 37 is being turned to vary the force exerted by the spring 28. As the force exerted by this spring is varied, the gate controlling the flow of water to the water wheel is opened or closed as the case may be, thereby altering the speed of the prime mover until the frequency of the generator approaches that of the distribution system. When the frequency of the generator substantially corresponds to that of the distribution system, the speed of rotation of both shafts 90 and 48 is very greatly reduced. Then, as the speed of the shaft 48 reduces, the time the circuit 97, 98, 99 remains closed is increased until the duration of such time is sufficient to cause the closure of circuit 100—101 through the retarded relay 95. When this occurs, the line switch 19 is closed and the generator cut in. The generator then takes load as previously described through the solenoid 111 until a sufficient percentage of the load is being handled thereby, which may be adjusted through an adjustment on the core 112 of said solenoid indicated at 118. The generator then feeds the distribution system until the switch 79 is opened, the fluid under pressure is cut off from the governor proper through the solenoid 77 assuming normal position and the circuit 70 opened through the solenoid 80. The maintaining circuit 107—108 which maintains the line switch 19 closed, is hence de-energized and the line switch 19 drops back to normal open position. Upon de-energization of magnet 77, the governor 20 cuts off the water supply to the water wheel which stops the water wheel and all of the parts are again in normal position as shown in Fig. 1.

It is to be noted that with my invention that the device for matching the frequency of the generator with that of the distribution line is operated solely from windings energized from the distribution line and generator line. By means of this construction the synchroscope or other motor utilized may be disposed in close proximity to the governor and need not be operated through mechanical drives from either the generator or water wheel. This makes the installation of the system much simpler than where a mechanical drive is required for rotating some part of the synchroscope. It is to be further noted that the synchroscope utilized for adjusting the governor spring loses in speed as synchronism is approached. This makes the device far more accurate since the gate is opened or closed very slowly near synchronism and is operated much more rapidly when the generator is completely out of synchronism. The system hence functions to rapidly alter the speed of the generator to that required to bring the frequency of the generator up to that of the distribution system. Danger of the frequency of the generator passing that of the distribution line is hence largely eliminated since the manipulation of the gate controlling the water wheel is exceedingly slow when synchronism is approached.

Changes in the specific form of my invention as herein described may be made within the scope of what is claimed without departing from the spirit of the invention.

Having described my invention what I claim as new and desire to protect by Letters Patent is:

1. In combination, an alternating current distribution system, a generator adapted to supply electrical power thereto, a prime mover for said generator, a governor for controlling the speed of said prime mover, motive means including a revoluble member, said governor including a speed adjusting member mechanically driven from the revoluble member of said motive means, said motive means further including electrical circuits, one of said circuits being connected to the distribution system and another of said circuits being connected to the generator, a circuit for rendering said motive means circuits operable, said last named circuit being energized by the generator.

2. In combination, an alternating current distribution system, a generator adapted to supply electrical power thereto, a prime mover for said generator, a governor for controlling the speed of said prime mover, motive means including a revoluble member, said governor including a speed adjusting member mechanically driven from the revoluble member of said motive means, said motive means further including electrical circuits, one of said circuits being connected to the distribution system and another of said circuits being connected to the generator, one of said circuits including a coil carried by the revoluble member of said motive means, a circuit for rendering said motive means circuits operable, said last named circuit being energized by the generator.

3. In combination, an alternating current distribution system, a generator adapted to supply electrical power thereto, a prime mover for said generator, a governor for controlling the speed of said prime mover, motive means including a revoluble member, said governor including a speed adjusting member mechanically driven from the revoluble member of said motive means, said motive means further including electrical circuits, one of said circuits being connected to the distribution system and another of said circuits being connected to the generator, a circuit for rendering said motive means circuits operable, and means dependent upon the state of actuation of the generator for energizing said last named circuit.

4. In combination with an alternating current distributing system and a generator, means for connecting said generator to said system, a prime mover for said generator, a governor for controlling the flow of driving medium to said prime mover and including a movable control member for adjusting the operation of said governor, a first means for moving said control member during synchronizing of the generator and system and connected to said connecting means so that said first means is de-energized and left in its existing position when said connecting means is operated to connect the generator to the system, and a second means for moving said control member independently of the position of said first means, whereby said first means is ready to bring the generator to substantial synchronism prior to the succeeding connection thereof to the system.

5. In combination with an alternating current distributing system and a generator, means for connecting said generator to said system, a prime mover for said generator, a governor for controlling the flow of driving medium to said prime mover and including a movable control member for adjusting the operation of said governor, a first means for moving said control member and connected to said connecting means so that said first means is de-energized and left in its existing position when said connecting means is operated to connect the generator to the system, and a second means for moving said control member independently of the position of said first means and connected to said connecting means so that the governor is automatically adjusted for a greater supply of driving medium when said connecting means is operated to connect the generator to the system, said first and second means being alternatively controlled with said connecting means so that said first means is ready to bring the generator to substantial synchronism prior to the succeeding connection therefor to the system, and said second means is ready during the synchronizing period to effect the greater supply upon the connection of the generator to the system.

6. In combination with an alternating current distributing system and a generator, means for connecting said generator to said system, a prime mover for said generator, a governor connected to said prime mover for controlling the flow of driving medium thereto, and devices associated with said governor operative to bring said prime mover and generator to synchronous speed at no-load, and means operated with said connecting means for superseding the operation of said devices when the generator is connected to the system so that a greater flow of driving medium is then produced than that effected through said devices during synchronizing.

7. In combination with an alternating current distributing system and a generator; means for connecting said generator to said system; a prime mover for said generator; and a governor for said prime mover including a device movable for controlling the flow of driving medium to said prime mover, a device responsive to the speed of said prime mover, a connection between said devices having two relatively movable members, means for moving said members together whereby to adjust said connection and the governor for no-load synchronism of said prime mover and generator with the system, and means for moving one said member independently of the position of the other and actuated with said connecting means for producing an increased flow of driving medium when the generator begins to deliver electrical energy to said system.

8. In combination with an alternating current distributing system and a generator; means for connecting said generator to said system; a prime mover for said generator; and a governor for said prime mover including a device movable for controlling the flow of driving medium to said prime mover, a device responsive to the speed of said prime mover, a connection between said devices including a spring, a first member, a second member movable with respect to the first member, and a third member, first means for moving said second and third members relative to said first member for changing the stress in said spring and the position of said flow controlling device independently of the position of said speed responsive device, and second means operative independently of the positions of said first means and said second member for moving said third member relative to said second member.

9. A combination as in claim 8, in which said second means includes a solenoid and an energizing circuit therefor connected for closing when said connecting means connects said generator to said system.

10. In combination with an alternating current distributing system, a generator, means for connecting said generator to the system, a prime mover for said generator, governing means for said prime mover, and devices associated with said governing means operative during a starting period to bring said prime mover and generator to a predetermined speed condition relative to the frequency of the system, and means operated with said connecting means for superseding the operation of said devices when the generator is connected to the system so that when the generator is connected to the system, an increased flow of driving medium is delivered to the prime mover greater than that delivered under control of said devices during the starting period prior to the connection.

11. In combination with an electrical distribution system, a generator, means for connecting said generator to said system, a prime mover for said generator, means for controlling the admission of driving medium to said prime mover including first devices for adjusting the same during a starting period whereby to establish a predetermined electrical relation of the generator with the system, and second devices actuated with the closing of said connecting means for adjusting said controlling means and superseding said first devices to deliver an increased flow of driving medium to the prime mover when said generator is connected to said system.

12. In combination with an electrical distribution system, a generator, means for connecting said generator to said system, a prime mover for said generator, means for controlling the admission of driving medium to said prime mover including first devices for adjusting the same during a starting period preparatory to connection whereby to establish a predetermined electrical relation of the generator with the system, and second devices actuated with the closing of said connecting means for adjusting said controlling means and superseding said first devices and operating to increase the power output by said generator when connected to said system, said first devices being constructed and arranged to remain substantially in the adjusting position prevailing when superseded so that said first devices are ready immediately at the succeeding operation of preparing for connection to effect the bringing of the prime mover and generator substantially to said predetermined electrical relation between the generator and system.

13. In combination with an electrical current distributing system, a generator, means for connecting said generator to the system, a prime mover for said generator, and governing means for said prime mover; said governing means having devices responsive to the speed of the prime mover and devices actuated by said responsive devices for controlling the flow of driving medium to said prime mover, said devices including two separate movable elements each operative when moved to vary the flow of driving medium, first means for actuating said one element for regulating the flow for accelerating the prime mover up to a predetermined speed and thereby preparing the generator to proper electrical relation ready for connection to the system, and second means for actuating the other said element upon connection of the generator to said distributing system so that it thereafter controls the flow to the exclusion of said one means, said second means also being inter-connected with said first means so that said first means is disconnected and said one element remains substantially in its prevailing adjusted position while the generator is connected to the system, so that the said one element is ready immediately at the succeeding starting operation to effect the bringing of the prime mover substantially to said predetermined speed.

14. In combination with an electrical distribution system, a generator, means for connecting said generator to said system, a prime mover for said generator, means for supplying driving medium to the prime mover including supply regulating means; said regulating means including an adjustable first member for determining a small supply of driving medium to the prime mover for bringing the same up to a predetermined speed required at the time of the connection of said generator means for adjusting said first member for determining said speed to said distribution system, and a second member for producing a greater flow to said prime mover whereby to actuate the generator for delivering electric power to the system; and means actuated with the closing of said connecting means for causing the second member to effect such greater flow and operating to effect a maintenance of said adjusting means in its prevailing position.

15. In combination with an electrical distribution system, a generator, means for connecting said generator to said system, a prime mover for said generator, a governor for controlling the flow of driving medium to said prime mover and including a plurality of movable control means each operative separately from one another for adjusting the operation of said governor, means for actuating one of said control means for adjusting the operation of the governor to bring the prime mover and generator up to a predetermined speed required at the time of connection of said generator to said distribution system and means operating through another said control means for adjusting the operation of the governor to the exclusion of said one control means while the generator is delivering current to said system, said actuating and adjusting means being constructed and arranged to maintain said one control means in its prevailing adjusting position during operation of said other control means so that the said one control means is ready immediately at the next starting operation to effect the bringing of the prime mover substantially to said predetermined speed.

16. In combination with an alternating current distributing system, a generator, means for connecting said generator to the system, a prime mover for the generator, means for controlling the admission of driving medium to said prime mover including governing means for said prime mover, and devices associated with the said governing means for bringing the prime mover and generator to and substantially maintaining them at a predetermined speed condition demanded by the frequency of current in said system at the time of connection of said generator to said system, and means for superseding the operation of said devices and operative for effecting a greater supply of driving medium while the generator is in condition for delivering power through the connecting means to said system.

17. In combination with an electrical distribution system, a generator, a prime mover for said generator, and means for regulating the admission of driving medium to said prime mover including governor means responsive to the prime mover speed and means for controlling said regulating means; said controlling means comprising first devices cooperating with said governor means for bringing the prime mover and generator to and substantially maintaining them at a speed relation at which the generator may be connected to the system, second devices for superseding said first devices for effecting a greater supply of driving medium, and means responsive to the electrical relation of the generator and system for actuating said second devices when said electrical relation permits the connection of the generator to the system.

18. In combination with an electrical distribution system, a generator, a prime mover for said generator, and means for regulating the admission of driving medium to said prime mover including governor means responsive to the prime mover speed and means for controlling said regulating means; said controlling means comprising first devices cooperating with said governor means for bringing the prime mover and generator to and substantially maintaining them at a speed relation at which the generator may be connected to the system, second devices for superseding said first devices for effecting a greater supply of driving medium, and means responsive to the electrical relation of the generator and system for actuating said second devices when said electrical relation permits the connection of the generator to the system, said control means also including means for disconnecting and leaving said first devices substantially in the position occupied when superseded by said second devices, so that said first devices are maintained ready to operate at the succeeding starting operation for bringing the prime mover and generator substantially to said speed relation.

19. In combination with a distribution system and a generator for supplying electrical energy thereto, a prime mover for said generator, a governor for said prime mover having a speed control member for controlling the speed of said prime mover, adjusting means for adjusting said speed control member to bring the generator to synchronous speed, means for connecting the generator to the distribution system substantially at synchronism, and other adjusting means for independently adjusting said governor speed control member to cause the generator to take load, the setting of said first-named adjusting means remaining unaltered by adjustment of said second-named adjusting means.

20. In combination with a distribution system and a generator for supplying electrical energy thereto, a circuit breaker for connecting said generator to the distribution system, a prime mover for said generator, a governor for said prime mover including a speed control member for controlling the speed of said prime mover, and adjusting member movable between fixed limits for adjusting the operation of said speed control member to vary the load taken by said generator, a solenoid for moving said adjusting member from one limit to the other, a circuit for operating said solenoid, and a switch in said circuit operated by said circuit breaker.

21. In combination with a distribution system and a generator for supplying electrical energy thereto, a prime mover for said generator, a governor having a speed control member, control means movable to control the operation of said speed control member, said control means being capable of adjustment to bring the generator up to synchronous speed, other control means movable to control the operation of said speed control member, said last-named control means being movable over a path partly concurrent with that of said first-named control means, said second-named control means being movable beyond the position of said first-named control means attained at synchronism and operating independently thereof.

22. In combination with a distribution system and a generator for supplying electrical energy thereto, a fluid operated prime mover for said generator, a control member for governing the flow of fluid to said prime mover, adjusting means for adjusting said control member to bring the generator up to synchronous speed, means for connecting the generator to the system substantially at synchronism, another control member for governing the flow of fluid to said prime mover, adjusting means for independently adjusting said second-named control member to cause the generator to take on load, the setting of said first-named adjusting means remaining unaltered by adjustment of said second-named adjusting means.

23. In combination with a distribution system and a generator for supplying electrical energy thereto, a prime mover for said generator, means for controlling the admission of driving medium to said prime mover, means for connecting the generator to the system at a predetermined relative electrical condition of the generator and system, first means for adjusting said controlling means for bringing said prime mover and generator to said predetermined relative electrical condition preliminary to connection to the system, and second means for adjusting said controlling means independently of its adjustment by said first means.

ERICK PEARSON.